United States Patent [19]

Knox

[11] 4,345,313
[45] Aug. 17, 1982

[54] IMAGE PROCESSING METHOD AND APPARATUS HAVING A DIGITAL AIRBRUSH FOR TOUCH UP

[75] Inventor: Keith T. Knox, Rochester, N.Y.
[73] Assignee: Xerox Corporation, Stamford, Conn.
[21] Appl. No.: 144,507
[22] Filed: Apr. 28, 1980
[51] Int. Cl.³ .................... G06F 3/153; G06F 15/20
[52] U.S. Cl. .................................. 364/515; 340/709; 340/744; 340/793; 358/283
[58] Field of Search ................... 364/200, 515, 521; 358/80, 163, 283, 284; 340/707, 709, 723, 731, 744, 793

[56] References Cited

U.S. PATENT DOCUMENTS

| | | | |
|---|---|---|---|
| 3,911,419 | 10/1975 | Bates et al. | 340/709 |
| 4,196,454 | 4/1980 | Warren | 364/515 X |
| 4,200,867 | 4/1980 | Hill | 340/744 X |
| 4,225,861 | 9/1980 | Langdon, Jr. et al. | 340/744 X |

Primary Examiner—Jerry Smith
Attorney, Agent, or Firm—Ronald F. Chapuran; Michael H. Shanahan; John E. Beck

[57] ABSTRACT

A digital image processing system is disclosed wherein a cathode ray tube (CRT) binary display device has visual images created under control of a computer system. The visual images are screened facsimiles of a continuous tone image represented by digital raster image signals stored in the computer system. An image of an airbrush tip is superimposed by a cursor means in the computer system over a small (0.22×0.22 inch) region of a visual image on the display and is moved to different locations over the visual image by a pointer device manipulated by a viewer. The pointer supplies position signals X and Y to the cursor means. When a viewer simultaneously moves the pointer and depresses either buttons A or C on the pointer, the stored raster image signals associated with the visual image under the image of the airbrush tip have their tone changed. Depression of the A button causes an increase in tone and depression of the C button, a decrease in tone. A third button on the pointer causes a change in the size of the airbrush tip when simultaneously depressed with either of the other buttons A or C.

12 Claims, 2 Drawing Figures

IMAGE PROCESSING METHOD AND APPARATUS HAVING A DIGITAL AIRBRUSH FOR TOUCH UP

BACKGROUND

This invention relates to electrical image processing systems. Specifically, this invention relates to method and apparatus for touching up an electrical, continuous tone image upon operator interaction with a visual representation of the image on a display screen.

The publishing industry, for one, employs high resolution optical scanners to generate electrical, continuous tone raster image signals representative of continuous tone originals such as photographs and graphic art work. The raster image signals are used in electronic plate making equipment to modulate a scanning laser beam, an electron beam in a cathode ray tube (CRT) or the like to construct a facsimile of the continuous tone original on a suitable printing master. The content of an original must be in final form before the scanner generates the raster signals. The reason is that presently known electronic plate making systems have limited provisions for making changes to the electrical image like touch up by a graphic artist.

A touch up artist typically: changes shading; changes tone levels; corrects color hue; erases small, randomly located defects; fills in erased regions; adds a script signature; adds detail by free hand; and makes notations on the original. The changes or touch ups made by the artist usually result in an original being refabricated before it is suitable to be optically scanned. This, of course, is costly and increases editorial difficulties when the time needed to make a change is not available. The editing or correction operation is particularly complex when the original includes three or four color separation images which all need to be corrected.

A tool called an "airbrush" is used in the graphic arts to do at least some touch up work. The airbrush is a spray gun about the size of a pencil with a nozzle at the tip. The gun is coupled to a positive air source to spray watercolor pigments and is used to correct or obtain a given tone or to graduate the tone between two regions of different tone. In the plate-making process, the airbrush is used to direct a stream of an abrasive-like pumice onto a plate to remove spots or other unwanted areas. The electrical airbrush of the present invention is significantly different from that used in the graphic arts but the name is borrowed because it tends to be a helpful functional descriptor. One significant feature of the electrical airbrush totally lacking with a pneumatic airbrush is that tone or image density can be increased as well as decreased.

SUMMARY

Accordingly, it is a main object of this invention to overcome the above and other limitations associated with prior art image touch up activities.

Specifically, it is an object to design a touch up tool for modifying electrical signals representative of continuous tone images in contrast with replacing one set of signals with another.

Another object of the invention here is to make electrical touch up corrections to graphic images made from graphic originals using intermediate electrical signal representations of the graphic images.

It is also an object of this invention to devise an electrical airbrush device that can be manipulated as if it were a brush by an operator viewing a CRT display, or the like, to make corrections to an electrical raster image during near real time interaction between the operator and a displayed image.

The foregoing and other objects of this invention are achieved using a memory device to store the electrical signals representative of an image sought to be corrected. The electrical image is made visible to an observer by applying the electrical signals to a display device. An airbrush tip image is created on the display over the visual image. The electrical airbrush includes a pointer device that is manipulated by the viewer to touch up the continuous tone image. The pointer modifies the tone of the displayed image when it is moved in a brush stroke fashion and a button on the pointer is depressed. The movement of the pointer causes a like movement of the airbrush tip image over the displayed image. The motion and button depression enable the operator to obtain subtle yet complex image changes under the airbrush tip image with a stroking action like that of an artist working on a water color or oil painting.

The pointer, in one embodiment, includes a ball bearing that is rolled over a table top to generate position signals that move the image of the brushtip over the visual image on the display. The pointer also includes, in one embodiment, three buttons titled A, B and C. A viewer "touches up" an image by simultaneously rolling the pointer over the table top and depressing either the A or C button. The A button increases the tone level of the signals in the memory corresponding to the signals in the region of the airbrush tip. The C button decreases the tone level of image signals in the region of the airbrush. The B button in the example under discussion, increases and decreases, respectively, the size of the image of the brushtip when it is depressed along with either the A or C button.

PRIOR ART STATEMENT

Cursor and pointer devices used with image processing systems are well known. In fact, the Xerox Alto computer system having a display device with a pointer and a cursor is the system with which the present invention was implemented. U.S. patents that describe various aspects of the Alto system include: U.S. Pat. No. 4,103,331 titled "Data Processing Display System;" U.S. Pat. No. 3,911,419 titled "Controller for Cursor Positioning on a Display Medium;" U.S. Pat. No. 3,892,963 titled "Transducer for a Display-Oriented Pointing Device;" U.S. Pat. No. 3,898,377 titled "Video Mixer;" U.S. Pat. No. 4,148,098 titled "Data Transfer System with Disk Command Verification Apparatus;" and U.S. Pat. No. 4,103,330 titled "Task Handling in a Data Processing Apparatus." The disclosures of these patents are hereby incorporated by reference.

The Alto system has a binary display capability meaning that a raster image is stored in memory with a single bit representing the on or off condition of each pixel on the face of the CRT display. In addition, the system includes a feature that enables an operator to effectively write over the displayed image. The operator manipulates a pointer and in the process makes a constant density mark on the display in the region of the cursor image. The binary image pattern stored in memory is simply erased and replaced with the binary image of the cursor to achieve the writing over effect. This feature is of course, not suited for touch up work on continuous tone images having multi-bit numbers representing the tone level for each pixel element in a continuous tone image.

The Sci-Tex North American Corp., 75D Wiggins Avenue, Bedford, Mass. 01730 is the U.S. Sales Company for Sci-Tex Corporation Ltd., of Herzlia, Israel. Sci-Tex advertises a computer based system for color graphics under the trade name of Response-300. This system includes a pointer device for making corrections to a color image. It also speaks of having an airbrush capability. The changes made by the pointer are understood to be similar to the constant density marking changes described above as part of the Alto System. The Sci-Tex pointer replaces image data with a fixed density mark. The Sci-Tex system is a color system so the constant density mark that replaces existing image data has a constant color as well as a constant density. In contrast, the present airbrush modifies rather than replaces existing image data. Also, the airbrush of this invention requires movement of the brush over the affected area thereby simulating the hand motion of an artist working with a graphic picture.

The Alto system and other image processing systems, heretofore, make editorial corrections to regions of a continuous image by bracketing a region on a display. The bracketing is done by precise machine control such as entry of coordinates through a keyboard. It is possible in an Alto system to isolate a region of an image using the pointer and cursor to mark the coordinates on the screen. The changes to the image are executed uniformly over the bracketed area by the operator taking another keyboard or pointer action. The correction process doesn't occur in real time and is near impossible to use esthetically when the area requiring the change is a petal of a daffodil or other complex shape not easily bracketed.

In contrast, the electrical airbrush of this invention frees a viewer to address any region of a continuous tone image in real time and, with the motion of the airbrush, touch up the tone of the daffodil petal or the like.

THE DRAWINGS

The foregoing and other objects and features of the present invention are apparent from the specification, the drawings and the two taken together. The drawings are:

DETAILED DESCRIPTION

An electrical, continuous tone image is defined by a plurality of electrical raster image signals logically associated in time in a manner to define a raster pattern. Typically, but not necessarily, the raster pattern is a rectangular collection of generally parallel scan lines each including a plurality of pixels. Each of the electrical signals defines or corresponds to a pixel position within the raster and the magnitude or value of the signal represents the tone of the pixel.

The U.S. standard television (TV) receiver is an example of a display device that creates visual images from continuous, tone raster image signals. The TV signals are analogue signals whose magnitudes are related to the tone of the image referred to a luminance. In color broadcast systems, color analogue signals are transmitted with the luminance signal. At the receiver, a three gun CRT has demodulated red, green and blue separation signals, respectively, applied to the three guns. The face of the color CRT is made up of a plurality of small areas or color pixels each including red, green and blue light emitting phosphors. The three electron guns excite the three phosphors at each pixel according to the red, green and blue separation, raster image signals.

Digital, continuous tone raster image signals are either synthesized by a computer or are created by optically scanning an original such as a photograph or a graphic art work. The optical scanner normally generates an analogue signal in response to the reflection density, or tone, of a pixel in the original. An analogue to digital converter transforms the analogue signal into a digital signal. Hereinafter, only digital signals are discussed but it should be understood that the present method and apparatus also is applicable to analogue raster image signals.

The digital raster image signals discussed hereinafter are eight bit binary numbers ranging in magnitude or value from 0–255. The zero (0) tone level represents black and the 255 tone level represents white for a light emitting display such as a CRT. White in a CRT display means full electron beam intensity and black means the electron beam is off. The two hundred fifty-four tone levels between white and black effectively define a continuous tone range in most displays even though the values are discrete rather than continuous as is the case with an analogue signal. In a color CRT display device, the zero level means no light (whether red, green or blue) is emitted by a phosphor—i.e. black or the minimum level—and the 255 level means full or maximum emission—i.e. white. To use the foregoing digital signals to make black (or in a color system yellow, magenta and cyan) marks on white paper the signal sense must be inverted. Similarly, to make a negative—in the photographic sense—of a displayed image, the sense of the digital raster signal need only to be inverted.

Figure 1:
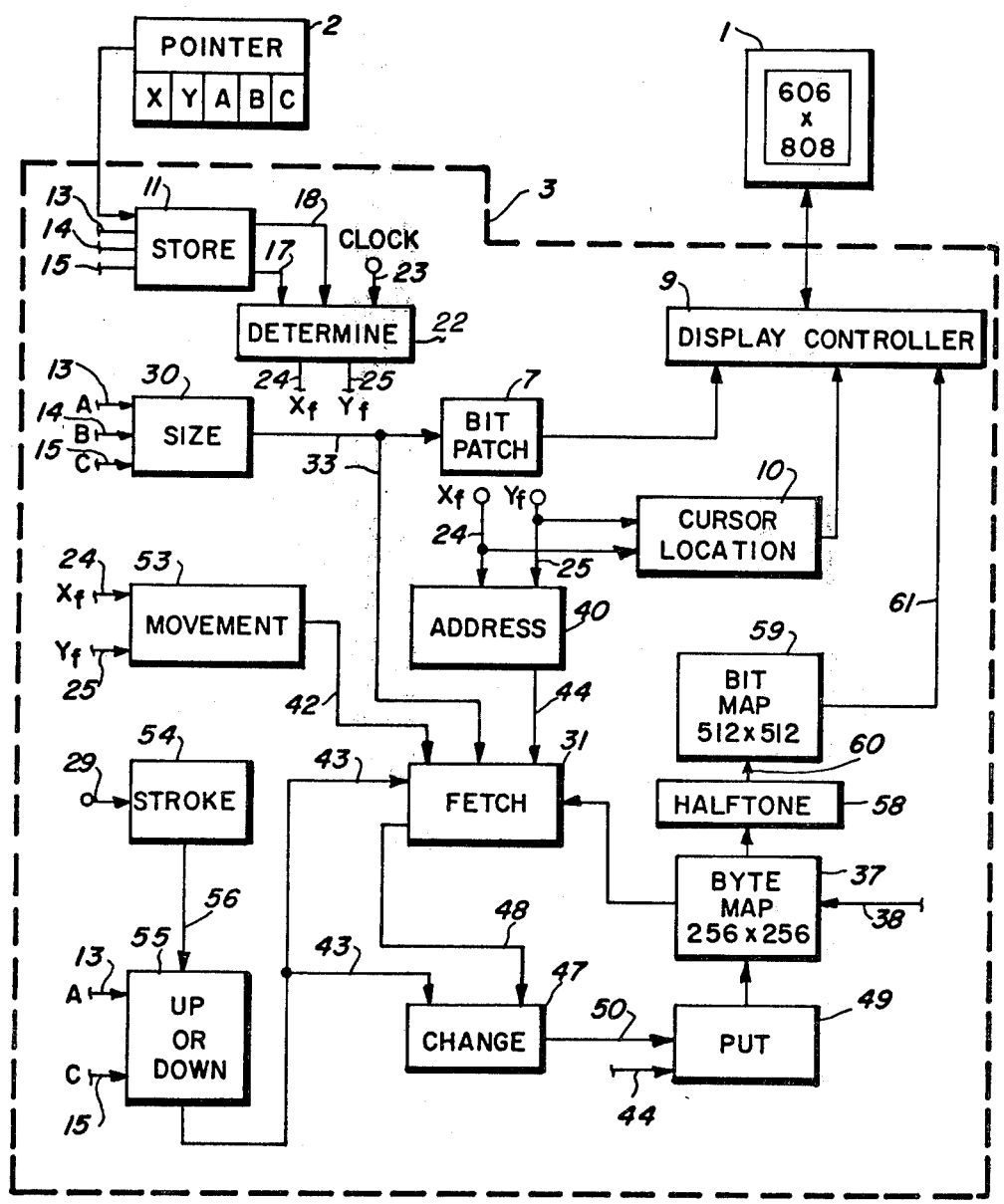
FIG. 1 is a combined hardware and software functional schematic of an electrical image processing system employing an electrical air brush according to the present invention.

Turning now to FIG. 1, the illustrated image processing system includes the display means 1, the pointer means 2 and the control means 3 which includes hardware and software represented by the boxes interconnecting the pointer and the display.

The display is a black and white CRT display device with a rectangular display screen roughly the dimension of an 8.5×11 inch U.S. standard page size with the long edge vertical. The raster image created at the display includes 606 pixel elements per line across the display (the 8.5 in dimension) and 808 scan lines up and down the display. The display is the type that requires refresh and half the image is refreshed every one sixtieth (1/60) of a second. The total image is divided into two frames each including 404 lines that are interleaved every one thirtieth of a second to create the visual image of the continuous tone raster image signals.

The display 1 is a binary display requiring a halftoning, screening or dithering operation to be performed on the continuous tone raster image signals prior to their application to the display. It should be clear that the invention is applicable to continuous tone display devices. The binary display 1 is chosen herein because it is the display used in the Alto system on which the electrical airbrush was implemented. In fact, electrical graphic composition systems of the type used in the publishing industry employ continuous color CRT displays rather than a binary display.

By binary display is meant that the individual pixel elements making up the raster image in the display 1 are either in an on or off state. Device 1 is a CRT in the Alto system. The CRT has a continuous coating of phosphor and its associated video control circuits give 606 opportunities for the electron beam to be turned on or off (or up and down) during a linear sweep of the beam along a line in the raster pattern. In contrast, a continuous CRT display activated by an eight bit raster image signal is able to set the electron beam intensity to 256 different levels during the 606 pixel element periods within a scan line sweep.

The pointer 2 is a device of the type disclosed in the above identified U.S. Pat. No. 3,892,963 titled "Transducer For a Display-Oriented Pointing Device" which is incorporated by reference into this disclosure. Briefly, the pointer includes one or two roller devices coupled to the wiper arm of a potentiometer. The roller devices, a ball or a wheel, cause the wiper arm to move relative to the potentiometer end points thereby developing a linear signal representative of the angular position of the roller device. A single roller or ball is coupled to two wiper arms by means that respond to orthogonal movement of the ball. The two roller device has one wheel oriented orthogonal to the other. In both cases, X and Y position signals are generated by the angular position of the roller. The angular position is represented by an electrical position signal generated by the potentiometer. The position signal is scaled so that hand movements of the pointer 2 over roughly an 8.5×11 inch area on a table adjacent the display effect movement of a cursor pattern over the 8.5×11 inch display screen on device 1. Consequently, hand motions made by rolling the pointer over the table approximate like movements of an artist touching up a photograph, graphic art work, line copy or other image having the familiar 8.5×11 inch scale.

Touch up by the pointer 2 is achieved, in the present embodiment, by two distinct hand manipulations. The first is the movement of the pointer 2 over a table. The potentiometer continuously produces X and Y coordinate position signals as indicated by the X and Y symbols on pointer 2 in FIG. 1. The second viewer manipulation is to depress either of two buttons identified as buttons A and C on pointer 2 in FIG. 1. Movement coupled with depression of button A causes an increase in image tone and movement coupled with depression of button C causes a decrease in image tone.

The increase and decrease in image tone occurs in the region of the visual image on the display screen covered by a cursor pattern. The cursor pattern is an image of a brush tip, i.e. a selected small shape, superimposed over the 8.5×11 visual image created on the display. The cursor pattern is created by cursor signals stored in cursor memory means 7 that are mixed with the raster image signals (also referred to as the video signals) at the display controller 9. The cursor means also includes cursor location means 10 that applies $X_f$ and $Y_f$ coordinate signals to the display controller 9 to indicate the location of the cursor pattern or airbrush tip on the display screen of device 1. The coordinate signals are those generated by the pointer 2 at the last frame cycle and are indicated as $X_f$ and $Y_f$ inputs to the cursor location means 10. That is, the displayed cursor position is updated every 1/60 seconds which is the frame clock rate in this embodiment.

The control means 3 includes the cursor memory 7, display controller 9 and cursor location means 10. The control means 3, in the Alto system under discussion, is a 16 bit digital computer system including a central processing unit (CPU), main memory, input and output controllers, appropriate buses and control logic. The system architecture is described in connection with FIG. 2 infra.

The control means 3 is coupled to receive the X and Y position signals and A, B, and C button signals from pointer 2. The X and Y position signals are received as 16 bit binary signals from an analogue to digital (A/D) converter (not shown) and the A, B and C signals are one bit binary signals received on three lines each indicating the depressed and normal states of the three buttons. A pointer memory means 11 stores the X, Y, A, B and C signals and makes the instantaneous values (substantially instantaneous) of these signals available to the rest of control means 3 over single wire lines 13, 14 and 15 for the A, B and C signals and over the 16 bit buses 17 and 18 for X and Y. The $X_f$ and $Y_f$ position signals, defined above, locate the brush tip on the display. The $X_f$ and $Y_f$ signals are generated by determination means 22 coupled to receive the X and Y signals from store means 11. The $X_f$ and $Y_f$ signals are generated by gating the values of X and Y into an appropriate register through a logic gate clocked by the frame clock signal received over line 23. The $X_f$ and $Y_f$ signals are distributed throughout control means 3 via the sixteen bit buses represented by lines 24 and 25.

The size of the brush tip (cursor pattern) displayed over the visual image is variable. The cursor memory or bit patch 7 contains sixteen, 16 bit words that are logically applied to the display in a manner to describe a pattern in a 16×16 pixel region. The actual bit pattern is a checkerboard pattern that gives a density to the cursor image that is detectable but yet permits the visual image beneath it also to be seen. The 16×16 pixel region is the maximum brush tip size. It can be reduced down to a 2×2 pixel pattern by size signals developed at size selection means 30. Size selection means 30 generates size signals that are applied to the cursor memory means 7 and to fetch means 31 explained below.

The size signals change the lower right hand corner coordinates for the 16×16 pixel brush tip. Initially, the full 16×16 bit patch defines the air brush. The size signal is a two bit binary signal or number that includes one bit combination that cause the 16×16 bit patch to be reduced by two rows and two columns each time buttons C and B on pointer 2 are depressed. A second bit combination causes the coordinates of a bit patch to increase by two rows and two columns each time buttons A and B are depressed until the full 16×16 size is reached. The A, B and C signals are applied to size means 30 over lines 13–15. Size means 30 includes AND logic that operate on the A, B and C signals to sense the command intended by the viewer.

An 8.5 inch wide display screen having 606 pixels defines the maximum brush tip size for the 16×16 bit patch at about 0.22×0.22 inches.

The foregoing describes how the pointer 2 is used to move the cursor pattern, i.e. the airbrush tip, to different locations on the screen display and how it is used to change the size of the brush tip. Next, the process for changing the tone values of stored raster image signals that create the visual image on the display 1 is described.

The full 606×808 pixels available at the display 1 are not used in the present embodiment in order to conserve memory space. The continuous tone raster image is limited to a 512×512 pixel region on the display. In addition, only ¼ of the continuous raster image signals defining a 512×512 pixel image are stored. The full 512×512 pixel display is made with a 256×256 matrix of eight bit image signals that are doubled to provide the 512×512 image. The doubling occurs by replicating once each pixel in a row and then replicating once the entire row.

The 256×256 matrix of image signals are stored in a byte map memory 37. Memory 37 includes a 64 kilo byte memory capable of storing the 524,288 bits representing the 256×256 matrix of 8 bit signals (one byte equal eight bits.) The control means 3 includes two banks of 128k byte memory (memory 105 in FIG. 2) that serves as the memory for the byte map, bit patch and other memory means discussed herein as well as containing the software needed to execute various functions in the system of FIG. 1.

The bytes in memory 37 are numbers that represent the tone level (0–255) of each pixel in a 256×256 continuous tone raster image. The raster image information is conventionally loaded into memory 37 from a disc storage memory represented by line 38 in FIG. 1. As mentioned at the outset, the image stored on a disc memory is created in several different ways. One way is synthetically by a machine such as a computer. Another way to create the raster image signals is to optically scan an original document, photograph, art work or the like to generate the eight bit tone values for the pixels in a raster scan image.

The pixel values in byte map 37 are changed by the operator manipulation of the pointer 2. The changes are to bytes within the memory 37 corresponding to the bits in the region of the cursor patch or airbrush tip.

The image at display 1 is updated every 1/60th seconds or 16.7 milliseconds (ms). Therefore, the control means 3 has that period of time in which to make changes to the eight bit numbers in the byte map 37 in response to an operator manipulation of the pointer 2. The size of the airbrush tip and the $X_f$ and $Y_f$ position signals are needed to make the change to the byte map. The size signals from means 30 are applied to the fetch means 31 as indicated by line 33. For a full size 16×16 airbrush tip, the size signals enable the fetch means to pull 64 bytes from memory. Sixty-four bytes are addressed rather than 256 bytes because the image is doubled before being displayed as explained earlier as a means of conserving memory space. The doubling process also means that the smallest size the airbrush tip can be reduced to is a 2×2 pixel region which is represented by a single byte in the byte map memory.

The $X_f$ and $Y_f$ signals are applied to the address select means 40 as indicated by lines 24 and 25. Address select means 40 develops addresses from $X_f$ and $Y_f$ for the 64 bytes, or smaller number, that are supplied to the fetch means 44 to enable it to pull the intended region in the byte map.

The airbrush touch up operation begins when the fetch means 31 receives enable signals represented by lines 42 and 43. The enable signal represented by line 42 is a move enable signal and that of line 43 is a tone enable signal. These enable signals activate the fetch means 31 causing the 8×8 bytes associated with the brush tip—as supplied by address means 40 via line 44—to be retrieved from memory sequentially except when size signals received on line 33 indicate a smaller size brush tip. In that case, only the reduced number of bytes corresponding to the smaller brush tip are retrieved.

The retrieved bytes are supplied to the byte change means 47 from the fetch means 31 as indicated by line 48. The change means 47 adds or subtracts a constant number to the retrieved bytes and passes the changed byte onto put means 49 over line 50. The Put means also receives the brush tip location over line 44 from the address select means 40 and replaces the changed byte into the location within the bit map memory 37 from which it was retrieved.

The byte change means 47 also performs a test on each changed byte to insure that its new value does not exceed the limits of 0–255. For example, a byte having a tone value of 248 that is increased by the value 10 is limited to the value 255. Similarly, a byte having a tone value of 7 that is decreased by the value 10 is limited to the value 0. The 0 and 255 values represent black and white. The limit test is performed to keep the 248 value from being increased to the logically inconsistent value 3 and the 7 value from being decreased to the logically inconsistent value 252.

The move enable signal of line 42 is developed by movement test means 53. Earlier it was reported that the pointer 2 effects tone changes when the pointer is moved over a table top by a viewer and either button A or C is depressed. The motion is detected by movement test means 53. The position signals $X_f$, $Y_f$ are supplied to the movement means over lines 24 and 25. Means 53 tests for non-zero values for the differences between $X_f$ and $X_{fo}$ and $Y_f$ and $Y_{fo}$ where $X_{fo}$ and $Y_{fo}$ are the values of $X_f$ and $Y_f$ at the previous frame clock occurrance. If either difference is non-zero, the pointer has been moved or is moving. The non-zero detection results in the generation of the move enable signal of line 42.

The tone enable signal of line 43 is generated by the stroke weight means 54 and the polarity means 55. The amount of change to the tone value made by byte change means 47 is stored in the stroke weight means 54. The stored number is a matter of operator selection and ranges from 1 to 255. The desired number, i.e. the stroke weight signal, is entered into means 54 via the keyboard as represented by line 29 shown at means 54.

The output of the stroke weight means 54 is applied to polarity means 55 as represented by line 56. Polarity means 55 is coupled to lines 13 and 15 to represent receipt of the A and C signals. The depression of the A button on pointer 2 sets the polarity of the stroke weight signal positive and the C signal sets it negative. The depression of either the A or C button also causes the polarity means to put the stroke signal onto line 43 which is the tone enable signal for the fetch means 31. The polarity of the stroke weight signal applied to the fetch means of line 43 is not important since it acts solely as an enabling mechanism. The stroke weight signal polarity is important to the byte change means 47 because a positive polarity increases the tone of a raster image signal and a negative polarity decreases it.

The operator or viewer selects the stroke weight number stored in means 54 based on the use intended for the airbrush. When blending of the tone level of one section of an image to another is the objective, the operator selects the stroke weight number to be from 1 to about 16 or less than ten percent of the available tone range and the A button is depressed. When erasing is intended, the stroke weight number is set to 255 and the C button is depressed. When signature in black or a black out of an area is intended, the stroke weight number is set to 255 and the A button is depressed. Stroke weight numbers between 16 and 239 have uses for other touch up operations suited for a given image.

The image stored in the byte map means 37 must be doubled and screened before being applied to the binary display device 1 as explained earlier. The doubling is to expand or magnify the 256×256 pixel image to the intended 512×512 pixel size. The screening is to enable the binary display device to create a facsimile of the stored continuous tone image in the byte map memory. If a continuous tone display device is available, the magnified signals in the byte map 37 can be applied via appropriate interconnection to the continuous display.

The doubling and screening are performed by the halftone generator 58. The generator 58 continuously scans the 256 lines within the byte map to see if a flag has been set to indicate that a line should be halftoned. The flags for all 256 lines are set automatically when the image signals are first loaded from a disc into the byte map. During airbrush operation, the line flags are set when fetch means 31 calls for a given region of an image to be pulled for effecting the operator requested tone changes. Halftone means 58 cancels the flags at the start of the changed lines when the halftoning is completed for each line. The entire line containing a requested change is doubled and halftoned not just the affected image signals within the line.

The doubling is achieved by repeating once the value of each of the 256 image signals thereby creating a 512 length line. The halftoning occurs serially on each image signal in the line. The first image signal is halftoned and that same signal is halftoned a second time due to the doubling operation. The halftoning process causes a one or zero to be generated for each of the 512 continuous tone signals in a line. These ones and zeroes are the halftoned image signals and are loaded into corresponding pixel locations into the bit map memory 59. The next 512 bit line is created by halftoneing the same 256 byte line one more time to double the image in the orthogonal direction. Consequently, each odd number 512 pixel line in the bit map and the subsequent even number line are generated from one of the 256 pixel lines in the byte map.

The screening halftoning or dithering operation used herein is a variation of a process known as the error diffusion, spatial grayscale technique reported by Robert W. Floyd and Louis Steinberg at pages 75–77 in the *Proceeding of the S.I.D.*, Volume 17/2, second quarter 1976. The disclosure of that article is hereby expressly incorporated by reference.

The halftoning technique here is to diffuse all the error into the next serially adjacent image signal within a line. In the technique reported in the article, the error is diffused or pushed into the next adjacent pixel in a line and in several pixels in the adjacent pixel locations within the next lower line.

The halftoning process includes thresholding the first byte in a line with a tone value representative of the mid-point between black (darkness) and white (brightness), for example the number 128 in the case of values ranging from 0–255. If the image signal value is greater than or equal to 128, the binary representation for that byte is one (bright), for example, and is zero (dark) if less than 128. The error that is diffused or passed onto the next pixel in the line is the difference between the tone value of the image signal being processed and 255 if the one bit is generated or zero if the zero bit is generated. The error is then algebraically added to the next image signal and that sum value is thresholded. The next image signal is the same in this example under discussion because it was doubled to magnify the length of the line. The error is continuously pushed forward to the next byte in the line throughout the line but is not carried forward to the next line. The first image signal in each line has a random error added to it. The added error causes the bit patterns in adjacent lines in the bit map memory to be different even though they are generated from the same byte line from the byte map. The doubling of the image signals prior to performing the halftone operation reduces the amount of image information lost due to the approximation of the continuous tone image by the halftone process.

A visual image of the screened image signals in the bit map 59 is created on display 1 by applying the screened signals to the display in interlaced frames of 256 lines every 16.7 ms. The screened signals are applied from the bit map to the display controller 9 as indicated by the line 61. The controller 9 includes a mixer that combines the cursor signal from memory 7 with the screened signals from bit map 59. The controller in turn applies the combined raster image and cursor signals to display 1.

Figure 2:
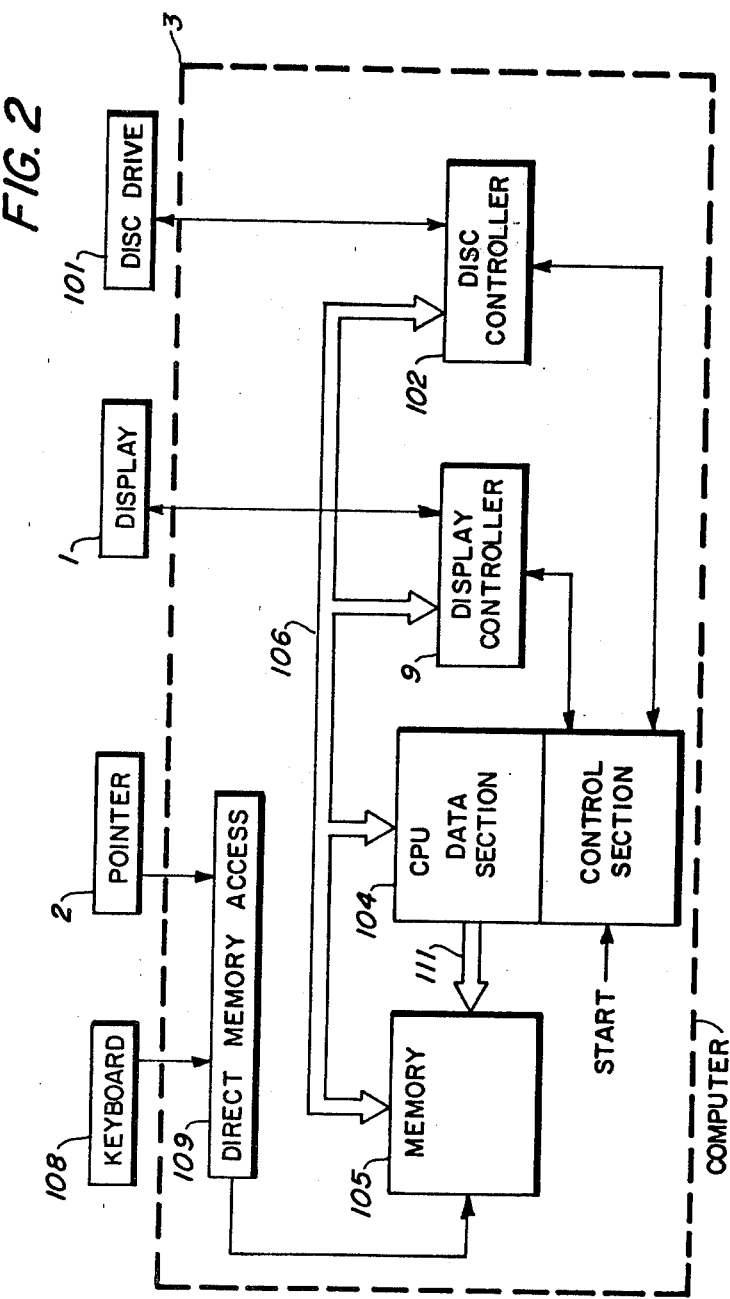
FIG. 2 is a hardware schematic for the system of FIG. 1.

FIG. 2 illustrates the architecture of the hardware used to implement the system of FIG. 1. Like items in the two figures have the same reference numbers. The control means 3 is coupled to the display 1 via the display controller 9. The disc drive 101 is coupled to control means 3 via the disc controller 102. The control section of the central processing unit (CPU) 104 regulates the operation of both controllers 9 and 102 to transfer video signals to the display and to load data from a storage disc into memory 105. Data, including the raster image signals and the cursor pattern image signals are transferred between the bit and byte maps 59 and 37 in the main memory and the controllers over a sixteen bit bus 106.

The pointer 2 and keyboard 108 are able to access certain memory locations in memory 105 directly through the direct memory access unit 109. The software programs necessary to perform functions described in connection with FIG. 1 are stored in memory 105.

The data section of the CPU 104 interprets the software instructions contained in memory 105 and by means of microcode executes the various requested functions. The addressing of locations in memory 105 is also performed by the data section 110 over the address bus 111.

In terms of the present image processing system, the memory means includes the memory 105. The display means includes display 1. The airbrush means includes the pointer 2, DMA 109, memory 105, CPU 104 and display controller 9. The functions performed by the apparatus is controlled in part by system software conforming to the flow chart aspects of FIG. 1 and the corresponding description.

Various modifications and variations of the foregoing described invention are obvious to those skilled in the art. Such modifications and variations are intended to be within the scope of the present invention.

I claim:

1. Electrical image processing apparatus comprising byte map memory means for storing raster image signals representative of continuous tone images wherein each signal has a value related to the tone level of a pixel within the continuous tone image, display means coupled to the memory means for creating a visual image in response to the raster image signals applied to it, cursor means coupled to the display means for applying cursor image signals thereto for creation of an airbrush tip image over a limited region of a visual image and for locating the airbrush tip image relative to the visual image in response to position signals and airbrush means coupled to the memory and cursor means including pointer means for generating position signals for controlling the location of the airbrush tip image relative to the visual image and control means for gradually modifying in given increments the tone level of raster image signals responsible for creation of the visual image at the region of the airbrush tip image in response to manipulation of the pointer by a viewer at least including movement of the pointer.

2. The apparatus of claim 1 wherein the control means modifies the tone level of a raster image signal by adding or subtracting a fixed tone level value to the raster image signals.

3. The apparatus of claim 2 wherein the fixed tone level added or subtracted to raster image signals is between a minimum change level and about ten percent of the total tone level range for blending the tone level of one region of a continuous tone image with that of another region.

4. The apparatus of claim 1 wherein the control means modifies raster image signals in response to movement of the pointer means coupled with actuation of button means by a viewer.

5. The apparatus of claim 4 wherein the pointer means includes at least A and C button means with the A means being actuated by a viewer to make a first modification to raster image signals and the C means being actuated by a viewer to make a second modification to raster image means.

6. The apparatus of claim 1 wherein the airbrush means includes means for varying the size of the airbrush tip image to vary the number of raster image signals modified by the airbrush means upon manipulation of the pointer by a viewer.

7. The apparatus of claim 1 further including means for creating a visual image at the display means every frame clock interval and wherein the control means modifies the raster image signals used to create a visual display within a frame clock interval selected to give the viewer a near real time visual image change corresponded to manipulation of the pointer by the viewer.

8. The apparatus of claim 1 wherein the display means includes a continuous tone display device for creating a continuous tone visual image from the stored raster image signals.

9. The apparatus of claim 1 wherein the display means includes a binary display device for creating a simulated continuous tone visual image from binary raster image signals formed from the stored continuous tone raster image signals.

10. The apparatus of claim 1 further including magnifying means coupled to the memory means for expanding the size of the continuous tone image displayed by the display device.

11. Electrical image processing method comprising
creating a visual image on a display device from continuous tone raster image signals representative of a continuous tone raster image with each signal having a value between a minimum and a maximum level related to the tone level of a pixel within the raster image,
creating on the display device an airbrush tip image over a limited area of a visual image and enabling the location of the airbrush tip image to be moved relative to a visual image in response to movement of a pointer device by a viewer of the images and touching up the tone levels of the continuous tone raster image signals by gradually modifying in given increments but not replacing the tone values of the raster image signals corresponding to the signals creating the visual image under the airbrush tip image in response to moving the airbrush tip image over the visual image by moving the pointer.

12. The method of claim 11 wherein the modifying step includes either increasing or decreasing the tone levels of raster image signals by a fixed tone level about ten percent of the range from the minimum to maximum tone level or less.

* * * * *